(12) United States Patent
Voloshchenko et al.

(10) Patent No.: US 11,194,046 B2
(45) Date of Patent: Dec. 7, 2021

(54) MULTIPLE FREQUENCY SIDE-SCAN SONAR

(71) Applicant: OOO "GIDROMARINN", Moscow (RU)

(72) Inventors: Vadim Yu. Voloshchenko, Taganrog (RU); Sergey P. Tarasov, Taganrog (RU); Anton Yu. Pleshkov, Seversk Tomsk Obl. (RU); Vasiliy A. Voronin, Taganrog (RU); Petr P. Pivnev, Taganrog (RU); Aleksandr P. Voloshchenko, Taganrog (RU)

(73) Assignee: OOO "GIDROMARINN", Moscow (RU)

( * ) Notice: Subject to any disclaimer, the term of this patent is extended or adjusted under 35 U.S.C. 154(b) by 0 days.

(21) Appl. No.: 16/914,197

(22) Filed: Jun. 26, 2020

(65) Prior Publication Data

US 2021/0018619 A1  Jan. 21, 2021

Related U.S. Application Data

(63) Continuation of application No. PCT/RU2018/000860, filed on Dec. 24, 2018.

(30) Foreign Application Priority Data

Dec. 28, 2017 (RU) .......................... RU2017146763

(51) Int. Cl.
*G01S 15/89* (2006.01)
*G01S 7/521* (2006.01)
*G01S 7/56* (2006.01)

(52) U.S. Cl.
CPC .......... *G01S 15/8902* (2013.01); *G01S 7/521* (2013.01); *G01S 7/56* (2013.01)

(58) Field of Classification Search
CPC . G01S 15/89; G01S 7/521; G01S 7/56; G01S 15/8902; G01S 15/02; H02P 23/14;
(Continued)

(56) References Cited

U.S. PATENT DOCUMENTS

| 6,842,401 B2 * | 1/2005 | Chiang | ................... G01S 7/521 367/138 |
| 10,746,871 B2 * | 8/2020 | Kim | ........................ G01S 15/42 |

(Continued)

FOREIGN PATENT DOCUMENTS

| RU | 31283 U1 | 7/2003 |
| RU | 2259643 C1 | 8/2005 |

(Continued)

OTHER PUBLICATIONS

International Search Report from PCT/RU2018/000860, filed Dec. 24, 2018, dated May 30, 2019.

(Continued)

*Primary Examiner* — Isam A Alsomiri
*Assistant Examiner* — Amie M Ndure
(74) *Attorney, Agent, or Firm* — Patentbar International, P.C.

(57) ABSTRACT

The invention relates to hydroacoustic equipment and can be used in constructing hydroacoustic systems. Multifrequency sonar side viewer comprising display unit, control unit, n-input adder, connected in series radio-frequency pulse generator, switch, multielement transceiving interference antenna, differs because of antenna aperture is made as cylinder-shaped bay, convex towards echo search, with radius of curvature R, that has generatrix l in azimuth plane and that is way longer than a chord, that draws together uttermost symmetric, relatively to the acoustic axe, points of arc with L length. The invention expands operational capabilities of sonar side viewer, reducing dead zone and increas- (Continued)

ing dimension of explored bottom surface swath in echo search direction, due to the using of non-linear self-action soundwaves effect.

3 Claims, 3 Drawing Sheets

(58) Field of Classification Search
CPC ............... H02P 27/08; H02M 7/5395; H02M 2001/0025; H02M 2001/0012; G01R 23/15
See application file for complete search history.

(56) References Cited

U.S. PATENT DOCUMENTS

| 2010/0067330 A1* | 3/2010 | Collier ............... G01S 15/89 367/88 |
| 2013/0016584 A1* | 1/2013 | Zhou ............... G01S 15/8902 367/88 |

FOREIGN PATENT DOCUMENTS

| RU | 152944 U1 | 6/2015 |
| RU | 2626072 C1 | 7/2017 |
| SU | 187327 | 10/1966 |
| SU | 1228659 | 12/1999 |

OTHER PUBLICATIONS

Clay, C. S, et al., Acoustical Oceanography: Principles and Applications, 1980, pp. 171-176, "MIR," Moscow.

Ocean Science, with Introduction by H. W. Menard, red. O. E. Mamaev, 1981, pp. 104-136, "Progress," Moscow.

* cited by examiner

MULTIPLE FREQUENCY SIDE-SCAN SONAR

RELATED APPLICATIONS

This Application is a Continuation application of International Application PCT/RU2018/000860, filed on Dec. 24, 2018, which in turn claims priority to Russian Patent Application RU 2017146763, filed Dec. 28, 2017, both of which are incorporated herein by reference in their entirety.

FIELD OF THE INVENTION

The invention relates to hydroacoustic equipment and can be used in constructing of hydroacoustic systems.

BACKGROUND OF THE INVENTION

Identifying the contour of the sea floor when it is mapped and its geological structure is explored is one of the main oceanography tasks. Appearance and widespread of echo sounders allowed to measure a depth incessantly while the vessel is in motion and to register a sea floor profile throughout a greater length, i.e. made depth measurement two-dimensional. At present, to register sea floor depth and its contour, to perform sonar mapping, mutually reinforcing devices are used: firstly, dual-frequency echo sounders installed on surface vessels with low-frequency tract providing quick but integrating wide-beam(300) sounding and with high-frequency tract that allows to spot greater details due to the narrow beam, secondly, deep-sea towing device that operates at an altitude(100-200 m) from the sea floor with hydroacoustic antennas irradiating sea floor at an oblique angle in a special way(the main irradiation lobe is knife-shaped, i.e. it is extensive in elevation plane and narrow in azimuth plane). Side-looking method gives the image of some base forms in greater details due to the registration of each ultrasonic echo signal coming from sea floor contour numerous elements located at different distances, though the interpretation and decipher of received data is a cumbersome process.

Current technical capacities provide sonar underwater obstacle detector and locator (see USSR Pat. No 187327 G01C, G08F; c1. 29.05.1963; publ. 11.10.1966) comprising a generator, a pulse modulator, a power amplifier, a switch, a pan tilt, a multielement transceiving hydroacoustic antenna, an amplifier, a detector, a display unit, a control unit. During the operation of the device a special hydroacoustic antenna construction is used, an active element of which comprises four electro-acoustical transducers that have different radiation beam patterns(BP), acoustic fields of which create desired form of total beam pattern (BP) as a result of superposition of acoustic waves in the medium. Construction of antenna is the following—to a flat orthogonal metal diaphragm (sized 70×20 mm) electro-acoustical transducers are stick, its signal electrodes are hermetically sealed and one-way beaming mode is provided with diaphragm being a cover to an air-filled antenna body. When operated radiated frequency of 525 kHz and mentioned diaphragm size are used, transceiving interference antenna forms an acoustic field with the following characteristics: in elevation plane($\theta$)/azimuth plane($\varphi$), angular width of the main lobe BP on the level 0,7 $\theta_{0,7(f)}=2°/\varphi_{0,7(f)}=7,2°$, the first side beams towards the direction $\theta_{1(SB)}=3,5°/\varphi_{1(SB)}=12°$ with level $P_{1(SB)}=(-13, 3$ dB), the second side beams towards the direction $\theta_{2(SB)}=5,8°/\varphi_{2(SB)}=20°$ with respect to the horizon with level $P_{2(SB)}=(-17, 8$ dB), the third side beam towards the direction $\theta_{3(SB)}=8,2°/\varphi_{3(SB)}=30°$ with respect to the horizon with level $P_{3(SB)}=(-21$ dB).

Spacial selectivity of transceiving hydroacoustic antenna has significant negative impact on accuracy and validity of underwater situation data which is one of the disadvantages of described system.

Features that coincide with claimed object: a generator, a switch, a hydroacoustic antenna, an amplifier, a detector, a display unit, a control unit.

Known sonar imaging system with operated frequency of 30 kHz is installed in the bathyscaphe "Archimede" [see Acoustical oceanography/Clarence S. Clay, Herman Medwin (New York etc., 1977) p. 171-176], submersibles "SP-3000" (France) "Alvin" (The USA) [see Ocean Science, with Introduction by H. W. Menard, San Francisco, 1977 pp. 104-136], containing multielement interference antenna equipped with reflector, control unit, display unit and tranceiving tract, that comprises generator, receiver and switch, where control unit outputs are connected with input controllers of display unit, receiver and switch; generator output is connected through a switch with multielement interference antenna input; the second switch output is connected with receiver input, the output of which is connected with display unit data input.

Disadvantages of such device are the following: inability to generate polyharmonic sounding signal using nonlinear effect in aquatic environment; losses when reflecting acoustic signals and probability of deformation of resulting beam pattern due to the trigger of own resonant oscillations in metal components of elaborate construction's acoustic screen-reflector.

Features that coincide with claimed object: a generator, a switch, a hydroacoustic antenna, an amplifier, a detector, a display unit, a control unit.

Known acoustic echo-pulse locator [see USSR Pat. No 1228659 G01S 7/52, publ. 20 Dec. 1999,], validated as a prototype, contains a display unit, a control unit, an input adder, connected in series radio-frequency pulse generator, a switch, multielement transceiving hydroacoustic antenna, chains of connected in series zonal filter with transmission frequencies, amplifier, detector and attenuator, that are switched in parallel in a way that filters inputs are connected and plugged in a switch, and attenuators outputs, input controllers of which are connected with control unit, are connected with adder inputs, output of which is connected with display unit signal input.

Disadvantages of this prototype are the following: constraint of energy potential of hydroacoustic antenna with size of its flat aperture area, beaming of areas with a small swath length with significant "dead" zone and probability of false data registration.

SUMMARY OF THE INVENTION

The objective of the invention is enhancement of sonar side viewer operational capabilities, that comprises reduction of a dead zone and expansion of bottom surface examined area towards echo search due to the use of nonlinear effect of soundwaves self-action.

Technical result of the invention is improving of quality of submarine objects' sonar image due to the registration and visualization of its diffused multiple-frequency ultrasonic fields that are formed in aquatic environment as a result of nonlinear self-action effect.

Technical result is achieved due to the following construction of multifrequency sonar side viewer that contains display unit, control unit, n-input adder, connected in series radio-frequency pulse generator, switch and multielement transceiving hydroacoustic antenna, with antenna aperture, consisting of transceiving surfaces of electro-acoustical transducer, and made as cylinder-shaped bay, convex towards echo search, with radius of curvature R, that has generatrix l in azimuth plane and that is way longer than a chord, that draw together uttermost symmetric, relatively to the acoustic axe, points of arc with L length; camber h, operations sector a, arc length L, chord a are connected in the following way: h=a×tg($\alpha$/4)/2=R[1−cos($\alpha$/2)]; L=0,01745R$\alpha$; a=2R sin($\alpha$/2).

Switch is connected with n chains that consist of connected in series zonal filters, amplifier, detectors and attenuators, parallel turned on in a way that zonal filters inputs with transmission frequencies f, 2 f, 3 f, . . . , nf are connected with switch output and attenuators outputs, inputs controllers of which are connected to the control unit, are connected with n adder inputs, output of which is connected with display unit signal input.

BRIEF DESCRIPTION OF THE DRAWINGS

The invention is explained in the drawings, where.

DETAILED DESCRIPTION OF THE PREFERRED EMBODIMENTS

Figure 1:
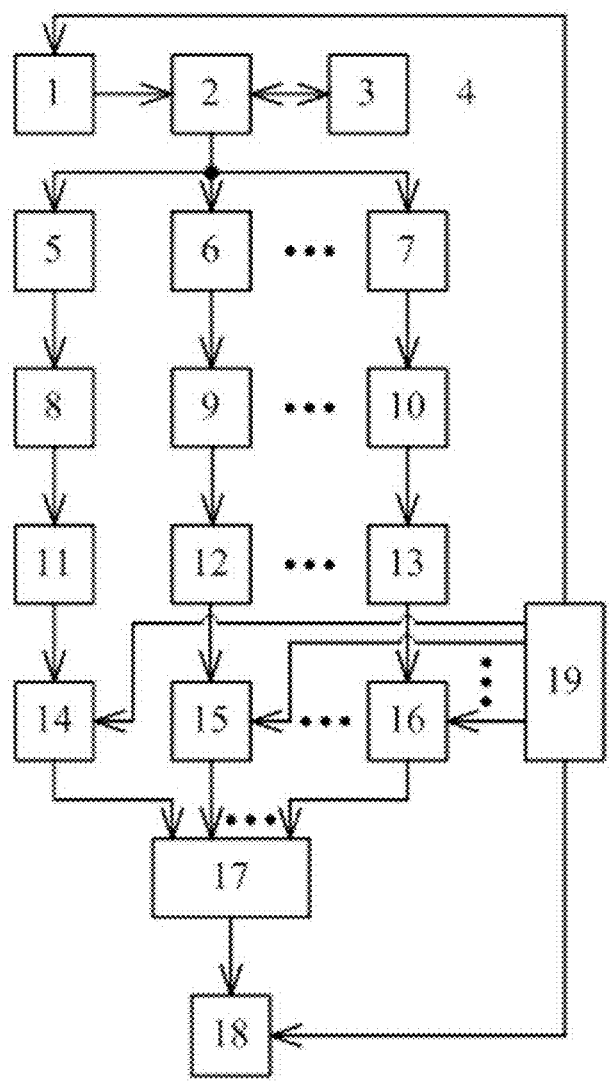
FIG. 1 shows a structural diagram of multifrequency sonar side viewer using nonlinear self-action effect.

Multifrequency sonar side viewer using nonlinear self-action effect (FIG. 1) comprises display unit 18, control unit 19, n-input adder 17, connected in series radio-frequency pulse generator 1, switch 2, multielement transceiving interference hydroacoustic antenna 3, that is able to perform acoustic contact with objects located in a scope of view through nonlinear aquatic environment 4. Antenna output 3 is connected with switch 2 through n chains of connected in series zonal filter(5,6, . . . 7), amplifier(8,9, . . . 10), detector(11,12, . . . 13) and attenuator(14,15, . . . 16) that are parallel switched in the way that zonal filters 5,6, . . . 7 inputs with transmission frequencies f, 2 f, 3 f, . . . nf are united and connected with switch 2 output and attenuators 14,15, . . . 16, control inputs of which are connected with control unit 19, are connected with n adder 17 outputs, output of which is connected with signal input of display unit 18.

Figure 2:
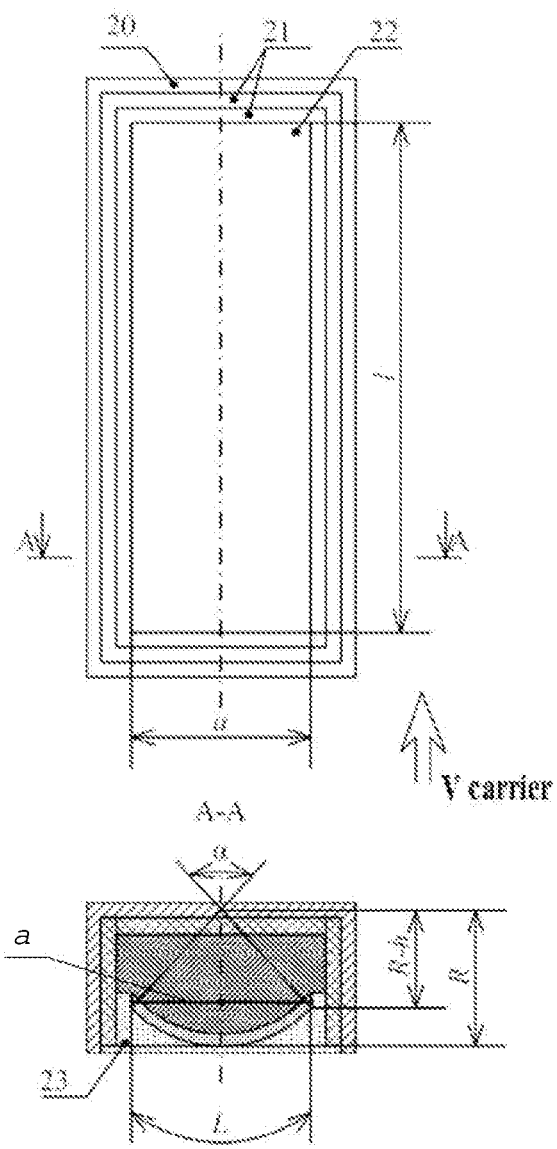
FIG. 2 shows a scheme of multielement transceiving interference hydroacoustic antenna.

Multielement transceiving interference hydroacoustic antenna 3(FIG. 2) of sonar side viewer consists of body 20, inner surface of which is covered with sound resistant screens 21, base (not shown in drawings) with fixed electro-acoustical transducers 22 having resonance frequency f, and sound transparent sealing compound 23 that fills internal volume of the body 20 and antenna aperture that consists of electro-acoustical transducers' tranceiving surfaces 22 is made as cylinder-shaped bay, convex towards echo search, with radius of curvature R, that has generatrix l in azimuth plane and that is way longer than a chord, that draws together uttermost symmetric, relatively to the acoustic axe, points of arc with L length; camber h, operations sector a, arc length L, chord a are connected in the following way: h=a×tg($\alpha$/4)/2=R[1−cos($\alpha$/2)]; L=0,01745R$\alpha$; a=2R sin($\alpha$/2).

The operation of multifrequency sonar side viewer is as follows. From input of radio-frequency pulse generator 1, control input of which is connected with control unit 19 output, radio-frequency pulse with basic frequency f gets to the multielement transceiving interference antenna 3 through switch 2. Due to the piezoelectric properties, electro-acoustical transducers 22 perform oscillations that through sound transparent sealing compound 23 are transferred into aquatic environment 4 and are spread crowding and discharging, i.e. spread as ultrasonic waves with high intensity in all directions, which creates in aquatic environment 4 ultrasonic field spreading from antenna. With cophased electrical excitation of all electro-acoustical transducers 22, that compose multielement interference antenna with transceiving aperture made as cylinder-shaped bay, its directional characteristic in aquatic environment would be determined by constructive interference in each point of aquatic environment 4, that appears in redistribution of ultrasonic energy as rolling cycle of amplitude upwards and downwards of resulting oscillation when rays deviation angle is changed, from normal to the line connecting oscillation sources(sound transparent sealing compound 23). When echolocation is performed, antenna transforms received impulses of electrical power and radiates powerful ultrasonic oscillations impulses of necessary duration. In this environment the role of sonar channel as of sound-conducting agents stars to change from "linear" acoustic, when the change of water density 4 still linearly depends on the change of sound pressure of pervasive wave process, which determines performance of principle of superposition, to "non-linear" acoustic, where nonlinearity of its elastic properties starts to appear, that causes self-action of finite amplitude spreading soundwaves, leading to the generation of new spectral components with frequencies f, 2 f, 3 f, . . . , nf. Thus, when spreading in aquatic environment 4 acoustic signal of finite amplitude have accumulating deformations of ultrasonic wave profile, which physically means generation of higher harmonic components 2 f, 3 f, . . . , nf of irradiated signal with frequency f.

Acoustic signal fields of upper harmonics have important spatial characteristics for echo search.

Figure 3:
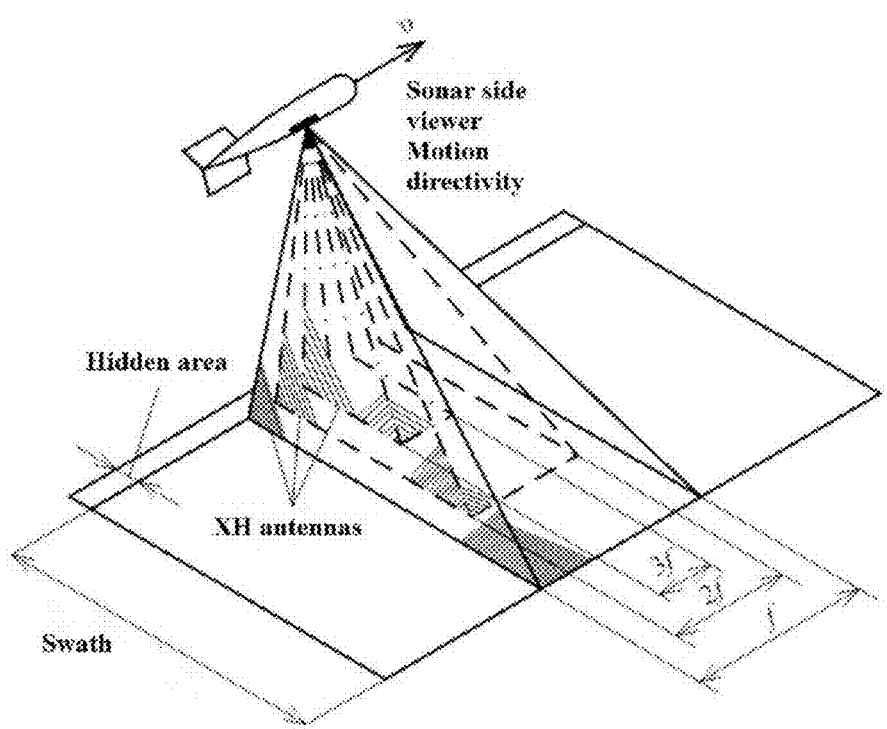
FIG. 3 schematically shows receiving of seabed sonar image due to the multifrequency sonar side viewer using nonlinear self-action effect.

Changing of aquatic environment 4 properties on acoustic axe of antenna 3 due to the powerful pump wave with frequency f happens in a greater way, which results on the main radiation maximum having smaller angular width on the level 0, 7 for each following harmonic with frequencies f, 2 f, 3 f, . . . nf in both elevation($\theta$) and azimuth($\varphi$) planes. In directions of additional maximums of radiation on the main frequency f changing of environment 4 properties happens to a lesser extent, which leads to inefficiencies in generation of harmonics in these directions, i.e. level of side field for each following harmonic is smaller. For example, for one of the variations of "transformed" model of multielement transceiving interference hydroacoustic antenna made as cylinder-shaped bay (operations sector $\alpha=45°$ in elevation($\theta$) plane) in radiation mode, angular width of the main lobe on the level 0, 7 and level of side field BP will be the following: $\theta_{0,7(f)_{RAD}}=32°$ и $P_{RAD}(\theta)_{1(SB,f)}=(-11)$ dB; $\theta_{0,7(2f)_{RAD}}=20°$ и $P_{RAD}(\theta)_{1(SB,2f)}=(-20)$ dB; $\theta_{0,7(3f)_{RAD}}=18°$ and $P_{RAD}(\theta)_{1(SB,3f)}=(-27)$ dB; $\theta_{0,7(4f)_{RAD}}=16.3°$ и $P_{RAD}(\theta)_{1(SB,4f)}=(-30)$ dB; $\theta_{0,7(5f)_{RAD}}=12,5°$ и $P_{RAD}(\theta)_{1(SB,f)}=(-30)$ dB accordingly and for receiving mode on spectral components of polyharmonic signal, level of side field $P_{REC}(\theta)_{1(SB,f;2f;3f;4f;5f)}=(-12$ dB) and multiples (~1/n) of angular width on the level 0, 7 of the main lobes: $\theta_{0,7(f)_{REC}}=32°$ (100 кГц), $\theta_{0,7(2f)_{REC}}=16°$ (200 кГц), $\theta_{0,7(3f)_{REC}}=10,7°$ (300 кГц), $\theta_{0,7(4f)_{REC}}=8°$ (400 кГц) и $\theta_{0,7(5f)_{REC}}=6,4°$ (500 кГц). This influence of non-linear self-action effect can be used to regulate antenna resolving power of proposed device in both elevation and azimuth planes on given spectral components with frequencies f, 2 f, 3 f, . . . , nf, it gives an opportunity to expend operational capabilities of sonar side viewer(FIG. 3). Impulse of multiple-frequencies of ultrasonic oscillations spreads in aquatic environment 4 and if there is an object with wave resistance that differs from water wave resistance, in this case reflection of acoustic oscillations from the object takes place and some part of impulse energy spreads backwards and reaches, after it went through sound transparent sealing compound 23, electrodes—operational surfaces of half-wave electro-acoustical transducers 22, that are in receiving mode. Auxiliary sonar "echo field" that is formed due to the oscillation superheating of the main frequency and its upper harmonics, influencing electrodes, is transmitted to piezoelectric material of half-wave electro-acoustical transducers 22 and as a result relative electrical oscillations appear on it, which gets through a switch 2 into n chains inputs, each of it consists of connected in series zonal filters 5, 6, . . . 7 with transmission frequencies f, 2 f, 3 f, . . . , nf, amplifier 8,9, . . . 10, detector 11, 12, . . . 13 and attenuator 14,15, . . . 16.

Reflected polyharmonic signal reaches multielement interference antenna 3, that is in receive mode and that produces electrical signals corresponding to mentioned above spectral components with frequencies f, 2 f, 3 f, . . . , nf. Levels of each electrical signal are determined by amplitude characteristic of direction $R_{p \cdot f}(\varphi, \theta)$, $R_{p \cdot 2f}(\varphi, \theta)$, $R_{p \cdot 3f}(\varphi, \theta)$, . . . , $R_{p \cdot if}(\varphi, \theta)$, and also by sensitivities $Y_f$, $Y_{2f}$, $Y_{3f}$, . . . , $Y_{if}$ in receiving mode of multielement interference antenna 3, for each acoustic wave scattered by boundary with mentioned above frequencies, where $\varphi, \theta$ are angles of scattered waves arrival in both azimuth and elevation planes, that are measured off from normal to antenna aperture 3.

Efficiency of directed performance of multielement interference antenna 3 in receiving echo signals in frequency band mode, corresponding to mentioned above range of reflected discrete components of formed radiation, even in incoherence will be enhanced, because total intensity is a result of energetic summation of separate spectral components intensities. Let us have a look at parallel processing of electrical oscillations with frequencies f, 2 f, 3 f, . . . , nf in n-channel receiving tract (filtration—blocs 5, 6, . . . 7; enhancing—blocs 8, 9, . . . 10; detection—blocs 11, 12, . . . , 13), feature of which is getting in attenuators 14, 15, . . . , 16 electrical signals amplitudes to required quantities before its processing in n input adder 17. Criterion of choosing coefficient quantity of attenuators 14,15, . . . ,16 transmission is necessity of forming equisignal shape of the main lobe of characteristic of direction of multielement interference antenna 3 in receiving mode, that provides uniformity of sonar image of seabed plateau in "slope distance" coordinate in the limits of swath due to the display unit 18. If, in the limits of transmission band of receiving tract discrete spectrum of frequency compounds is uniform, the main characteristic of direction in intensity $R_{P\cdot\Sigma}^2(\varphi, \theta)$ is arithmetic average of its characteristics of direction $R_{P\cdot j, i}^2(\varphi, \theta)$ for multielement interference antenna 3 in sindividual component frequencies:

$$R_{P\cdot\Sigma}^2(\varphi, \theta) = \sum_{i=1}^{n} R_{P i}^2(\varphi, \theta)/n,$$

where $R_{P\cdot i}(\varphi, \theta)$ is a characteristic of direction in pressure on i—frequency of discrete compound of spectrum, n is the total number of discrete frequency compounds of echo signal spectrum.

Claimed invention can be widely used in hydroacoustics due to the operational capabilities expansion of sonar side viewer, which is reduction of dead zone and increase of dimension of explored bottom surface swath in echo search direction, due to the using of non-linear self-action soundwaves effect. Ando also improvement in the quality of sonar image of USO is achieved, due to the registration and visualization of ultrasonic fields multiple-frequencies that are formed in aquatic environment as a result of non-linear self-action effect.

What is claimed is:

1. A multifrequency side view sonar comprising:
a display unit, a control unit, and an n-input adder; and connected in series a radio-frequency pulse generator, a switch, and a multielement transceiving interference antenna comprising electro-acoustical transducers with a resonance acoustic frequency f, the multielement transceiving interference antenna having an aperture formed as a section of a cylindrical surface; and the section of the cylindrical surface having a convex shape in a direction of an echo search, wherein the section of the cylindrical surface has a radius of curvature R, a generatrix l disposed in an azimuth plane, an arch of length L with end points of the arch symmetrical relative to an acoustic axis, and wherein the generatrix l is an order of magnitude longer than a chord a between the end points of the arch.

2. The multifrequency side view sonar of claim 1, wherein a camber h of the arch, a coverage sector a, the length L of the arch, and the chord a are related as follows: h=a×tg(α/4)/2=R[1−cos(α/2)]; L=0,01745Rα; a=2R sin(α/2).

3. The multifrequency side view sonar of claim 1, wherein the switch is connected via n circuits comprising connected in series zonal filters with transmission frequencies f, 2 f, 3 f, . . . , nf, amplifiers, detectors and attenuators, wherein the n circuits are connected in parallel in such a way that inputs of the zonal filters with transmission frequencies f, 2 f, 3 f, . . . , nf are connected to an output of the switch, control inputs of the attenuators are connected to the control unit, outputs of the attenuators are connected to n inputs of the adder, and the output of the adder is connected to a signal input of the display unit.

* * * * *